Oct. 21, 1930.    C. N. TEETOR    1,778,924
PISTON AND PISTON RING
Filed Nov. 5, 1925
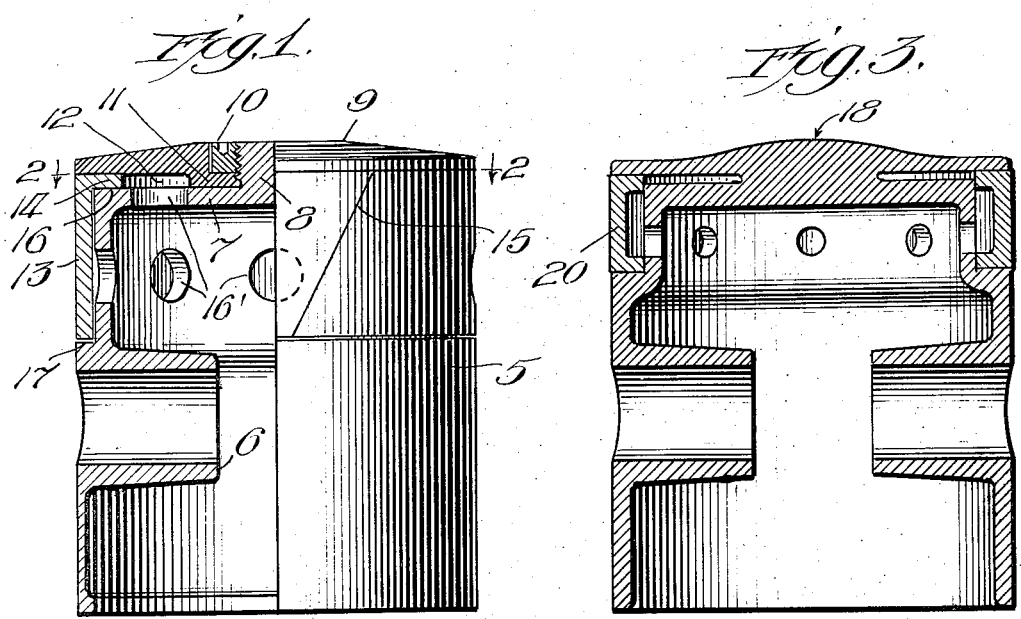
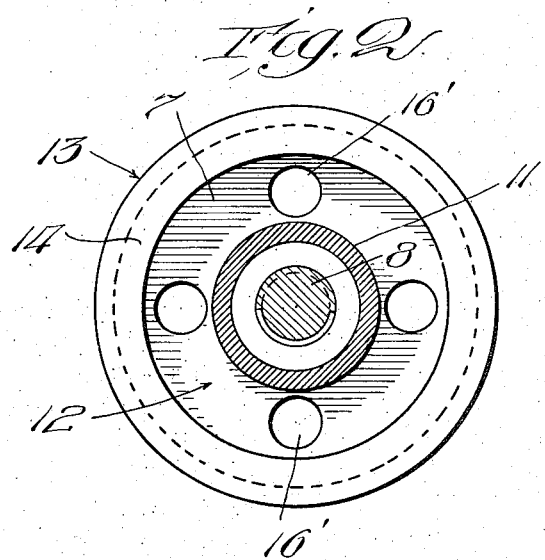
Inventor
Charles N. Teetor
By Rector, Hibben, Davis and Macauley
Attys Patented Oct. 21, 1930

1,778,924

UNITED STATES PATENT OFFICE

CHARLES N. TEETOR, OF HAGERSTOWN, INDIANA, ASSIGNOR TO THE PERFECT CIRCLE COMPANY, OF HAGERSTOWN, INDIANA, A CORPORATION OF INDIANA

PISTON AND PISTON RING

Application filed November 5, 1925. Serial No. 66,889.

This invention relates to piston and piston rings and the principal object of the invention is to provide a construction for effectually sealing or packing a piston ring in the groove in the piston to prevent leakage of fluid past the piston ring.

Various methods and means have been devised heretofore for applying pressure to the piston ring in an endeavor to prevent leakage past the ring or force the ring radially against the wall of the cylinder. It has been proposed to employ spring means for pressing one flat edge of the piston ring against the opposing flat side of the receiving groove and it has also been suggested that the piston ring be formed in two parts with springs or resilient means tending to press the two parts axially in opposite directions and against the opposite sides of the receiving groove but these structures are not satisfactory in practice, because, among other reasons they do not effectually seal the ring, the ring cannot adjust itself properly to meet changing conditions, and the structures are difficult and expensive to make. I am also aware that it has been suggested that the piston ring or an expanding ring cooperating with the piston ring be subjected directly to the pressure of the motive force (whether steam, gas, explosion, etc.) for the purpose of expanding the piston ring radially and causing it to press firmly against the wall of the cylinder. Another idea, which has been proposed is to provide a cap for the piston adapted to coact with a piston ring having inclined inner surfaces cooperating with complemental surfaces on the piston and cap, for the purpose of expanding the ring when pressure is exerted on the cap. I also find that these structures of the prior art are complicated in design and expensive to manufacture as well as deficient in operation as they have for their object the expansion of the piston ring radially against the wall of the cylinder and the piston ring is not effectually sealed at its edges in the receiving groove of the piston, with the result that there is undue wear on the ring and leakage past the ring.

The main object of my invention is to provide a piston which will effectually seal or pack the piston ring in it groove in the cylinder, without expanding it, while pressure is exerted on the head by the motive fluid in the cylinder of the engine, which merely for the sake of convenience will be considered herein as being an internal combustion engine. The motive force may be steam, an explosion or any gas and for the sake of brevity I will designate generally the pressure exerted by the motive force as "fluid pressure". To accomplish the principal object of my invention, I provide a head or flange which is movable relative to the body of the piston and which, when subjected to fluid pressure, presses against one edge of the piston ring in order to seal or clamp it edgewise in the receiving groove to prevent leakage behind the piston ring. More particularly, I provide a head having a flexible edge portion which is pressed or bent against one edge of the piston ring while fluid pressure is exerted against the head. In combination with this head with the flexible portion I also preferably make the top of the body of the piston flexible so that the head is also moved bodily when pressure is exerted on the head in order to augment or improve the sealing action of the ring in the groove and also equalize the strain to which the ring is subject.

Another object of my invention is to provide a piston ring having a flange which is clamped between the head and the body of the piston. While fluid pressure is exerted on the head, so that the packing or sealing takes place on the flange alone with less wear and strain on the whole ring while the major portion of the ring is left more or less free.

Among other objects of my invention is the provision of a detachable head and also to provide ventilating openings in the body of the piston for the purpose of permitting air to circulate under the head and behind the piston ring to cool them by carrying off the excess heat.

With the above and incidental objects in view, the invention consists in certain novel features of construction and combination of parts, the essential elements whereof are described in detail hereinafter and illustrated in full in the accompanying drawings.

On said drawings, Figure 1 is a side elevation, partly in section, of a piston and piston ring embodying the preferred form of my invention; Fig. 2 is a horizontal cross section taken on the line 2—2 of Fig. 1; and Fig. 3 is a vertical section taken through a piston and piston ring to illustrate a modified form of embodiment of my invention.

Referring to Fig. 1, the lower part or skirt of the body 5 of the piston is of the usual conventional design. The piston is provided with ordinary bosses 6 for receiving the wrist pin connecting the piston to the connecting rod. The top 7 of the piston body is preferably flat and is quite thin so that it is flexible and may hence act somewhat like a diaphragm, so to speak. The top 7 is provided with a centrally positioned threaded stud 8. A detachable head 9 is provided with a central boss 11 on its lower side, the boss being provided with a threaded opening to permit the head to be screwed on to the stud 8. The upper face of the head is centrally recessed for reception of a lock nut 10 which is screwed on to the upper end of the stud 8 by a spanner wrench or other suitable tool to restrain the head from unscrewing. It will be noted that the lower face of the central boss 11 of the head is adapted to rest on the upper face of the diaphragm top 7 so that an annular groove or space 12 of very substantial depth radially of the piston is provided between the head and top 7. The edge of the head is thin and the head tapers in thickness so that the edge portion is somewhat flexible and is adapted to yield when the motive force exerts a pressure thereon.

I preferably employ an inverted L-shaped piston ring 13 which is wider than usual and which is provided with a flange 14. The side of the upper portion of the piston body is recessed or offset inwardly to accommodate the piston ring 13 and the flange 14 rests on the seat 16 at the edge of the top 7 and the edge portion of the head 9 overhangs or projects over the upper edge of the piston ring and upper side of its flange 14. The piston ring is preferably slotted or split as indicated at 15. The top 7 and the side of the piston body behind the ring 13 are provided with series of openings 16' for the purpose of ventilating the piston ring and head from the inside of the piston whereby heat is carried away from the head and piston ring by the air circulating under the head and behind the ring.

From the foregoing description, the construction and advantages of my invention, as illustrated in the preferred form of embodiment, will be obvious. Assuming for the sake of illustration, that the piston is employed in a four-cycle internal combustion engine, the flange 14 of the piston ring is then relatively loose or free between the head and seat 16 on the piston, during the suction stroke the head being then in normal unflexed condition and the top 7 being likewise unflexed. During the suction stroke, the piston ring is free to adjust itself to meet the changing demands of the condition of the engine, cylinder and piston. The tension of the ring is such that the face of the ring is pressed against the cylinder wall with sufficient force to prevent leakage of fluid between the wall and the face of the piston ring, without employing other means, such as springs, fluid pressure back of the ring or auxiliary expanding rings for forcing the piston ring outwardly. In this respect, my invention is a departure from standard practice in which it is customary to permit the gas or motive force to pass behind the ring and expand it more firmly against the cylinder wall. During the compression, working and exhaust strokes of the engine, the pressure of the explosive mixture, of the explosion and of the products of combustion exerts a pressure on the head. This fluid pressure is sufficient to force or flex the edge portion of the head inwardly so that the lower flat face of the head presses firmly against the upper edge of the piston ring and its flange 14. At the same time, the top 7, acting like a diaphragm, flexes inwardly, so that the head as a whole moves inwardly or axially towards the piston and exerts additional pressure on the upper edge of the piston ring and its flange. The flange is thus forced firmly against the seat 16 on the top of the body of the piston the flange being clamped firmly between the head and the body of the piston so that the gases cannot escape or leak around the flange or in other words, cannot pass between the piston ring and the body of the piston. The greater the pressure on the head the greater is the clamping or sealing action which is the result desired. As the ring cannot be forced inwardly the face of the ring is held against the cylinder wall so that the leakage between the ring and cylinder wall is reduced to a minimum.

The flange 14 could be dispensed and the opposite edges of the ring sealed by the head and the lower side 17 of the recessed portion of the piston body, but it is an advantage to provide the flange and clamp the same between the head and the piston body for the purpose of sealing the piston ring in the groove as the wear on the piston ring is reduced and there is no undue distortive strain on the piston ring proper which to some degree can accommodate irregularities in the wall of the piston or changing conditions at all times.

The head is preferably detachable in order to permit the ring to be inserted in place when the head is removed so that it is not necessary to spring the ring over the head with deleterious results to the ring, such as undue radial distortion thereof.

The modification illustrated in Fig. 3 will now be described. In this form of embodiment, the head 18 may be integral with the top of the body of the piston though it may be made detachable as in the preferred form. While the top of the body may be flexible, yet in this embodiment I prefer to rely only on the flexibility of the overhanging portion of the head for clamping the piston ring 20 in its groove. The piston ring is preferably channel-shaped in cross section, so that it may be light in design and yet be provided with ample edge surfaces to reduce the wear and enhance the packing action. The ring is received in a groove formed in the body of the piston, the overhanging flange of the head forming the upper side of the groove. When fluid pressure is exerted on the head, its edge portion is flexed inwardly and presses firmly against the upper edge of the piston ring and at the same time forces the lower edge of the piston ring into firm engagement with the lower opposing side of the piston ring receiving groove. Thus, the ring is effectually sealed at its edges in the groove and no leakage takes place between the ring and the piston. During the suction stroke, the pressure on the head is relieved and the ring is free to readjust itself to accommodate any changing conditions in the cylinder.

While I have illustrated the preferred form of embodiment of my invention and also a modified form, yet it will be understood that various changes may be made without departure from the spirit of the invention. For example a plain, channel-shaped or L-shaped piston ring may be used so far as my broad invention is concerned. In place of a single ring a plurality of thinner superimposed rings may be employed. While I preferably employ the means of connection between the head and body of the piston illustrated in Fig. 1, I do not intend to limit my invention in its broader aspects to any particular form of connection.

I claim:

1. The combination of a piston ring self-sealing with respect to an engine cylinder, and a piston having a body and a head forming a receiving groove for said ring, said ring being adapted normally to fit freely in said groove, the said head being provided with an integral and imperforate portion movable relative to the body of the piston to clamp the ring in said groove against movement upon the exertion of fluid pressure against said head, said groove being shaped to permit such head movement.

2. The combination of a piston ring self-sealing with respect to an engine cylinder and a piston having an imperforate head provided with a flexible edge portion overhanging said ring.

3. The combination of a piston ring, and a piston having a body with a flexible portion, and a head secured to said flexible portion and having a flexible portion engaging said ring.

4. The combination of a piston ring having a flange, a piston having a body with a seat under said flange and a head adapted to be deflected under fluid pressure to clamp said flange between said head and seat.

5. The combination of a piston ring having a flange, a piston having a body with a seat under said flange and a head having a flexible edge projecting over and engaging said flange.

6. The combination of a piston ring having a flange, and a piston having a body provided with a seat for the flange and a flexible portion and a head secured to said flexible portion and having a flexible portion engaging the top of said flange.

7. The combination of a wide L-shaped piston ring having the flange at its upper end and a piston having an L-shaped groove for receiving said ring and a deflexible head engaging the upper side of said flange.

8. The combination of a piston ring self-sealing with respect to an engine cylinder and a piston having a body and a removable head forming a ring-receiving groove, the head being provided with an imperforate portion spaced from said body over an area deeper radially than said groove and movable relative thereto to clamp the ring in the groove against movement at the time when pressure is exerted against the head.

9. The combination of a piston ring and a piston having a removable head tapered toward its edge and provided with a flexible edge portion overhanging said ring.

10. The combination of a piston ring, and a piston having a body with a flexible portion, and a removable head secured to said flexible portion and having a flexible portion engaging said ring.

11. The combination of a piston ring and a piston having a body and a head in spaced relation and forming a groove, the head being provided with a portion spaced from said body to an extent deeper radially than said groove and movable relative thereto to clamp the ring in the groove against movement while pressure is exerted against the head, and the body of the piston being provided with openings leading between said head and body for ventilating the head.

12. The combination of a piston structure comprising a self-expanding member adapted to effectually self-seal against the cylinder, a body with a flexible element, and an imperforate head secured to and coacting with said flexible element, said head having a flexible flange adapted to retain said member and to be moved by the fluid pressure exerted on the head edgewise against said member to provide an effective seal between said head and member without expanding said member.

13. The combination of a piston structure comprising an expansible circular member adapted to seal against the cylinder, an active flexible top portion and a head carried by said portion and having a positive acting flexible portion engageable with said member.

14. The combination of a piston ring and a piston having a body and a head in spaced relation and forming a groove, the head being provided with a portion spaced from said body to an extent deeper radially than said groove and movable relative thereto to clamp the ring in the groove against movement while pressure is exerted upon the head, and the body of the piston being provided with openings leading between said head and body for ventilating the head and other openings leading into said groove for ventilating said ring.

In testimony whereof, I have subscribed my name.

CHARLES N. TEETOR.